United States Patent [19]

Cheyne

[11] Patent Number: 5,604,387
[45] Date of Patent: Feb. 18, 1997

[54] POWER SUPPLY DERIVED FROM MOTOR WINDING

[75] Inventor: Neil G. Cheyne, Auckland, New Zealand

[73] Assignee: Fisher & Paykel Limited, Auckland, New Zealand

[21] Appl. No.: 241,067

[22] Filed: May 11, 1994

Related U.S. Application Data

[63] Continuation of Ser. No. 810,389, Dec. 19, 1991, abandoned.

[30] Foreign Application Priority Data

Dec. 19, 1990 [NZ] New Zealand .............................. 236551

[51] Int. Cl.[6] ........................................................ H02J 1/00
[52] U.S. Cl. .......................... 307/125; 361/159; 318/245
[58] Field of Search ..................................... 318/244, 245, 318/293, 434; 307/96, 98, 116, 48, 117, 87, 125, 66, 130, 154, 99, 100, 104; 363/89; 323/905, 282, 324, 351; 327/530, 544; 361/159

[56] References Cited

U.S. PATENT DOCUMENTS

| | | | |
|---|---|---|---|
| 4,328,528 | 5/1982 | Kompelian ................................ 361/211 |
| 4,504,778 | 3/1985 | Evans ........................................ 323/323 |
| 4,649,302 | 3/1987 | Damiano et al. .................... 307/311 X |
| 4,780,788 | 10/1988 | Kammerer et al. ........................ 361/93 |
| 4,806,843 | 2/1989 | Mertens et al. .......................... 323/271 |
| 4,841,207 | 6/1989 | Cheyne .................................... 388/811 |
| 5,025,134 | 6/1991 | Bensoussan et al. ................ 323/236 X |
| 5,081,411 | 1/1992 | Walker .................................... 323/326 |

Primary Examiner—Fritz Fleming
Attorney, Agent, or Firm—Trexler, Bushnell, Giangiorgi & Blackstone, Ltd.

[57] ABSTRACT

A low voltage power supply which uses a low voltage transistor in conjunction with a winding of an electric motor and the high voltage motor commutation transistors. The motor winding is energised by the commutation transistors for example during use of the motor, and the low voltage transistor is used to divert current from the energised motor winding at desired intervals to provide the low voltage power supply. The low voltage supply may be used in an appliance such as a laundry machine for supplying the motor control circuitry and auxiliary devices for example, a drainage pump and water supply control valves.

15 Claims, 4 Drawing Sheets

POWER SUPPLY DERIVED FROM MOTOR WINDING

CROSS REFERENCE TO RELATED APPLICATIONS

This application is a continuation application of application Ser. No. 07/810,389 filed 19 Dec. 1991, now abandoned.

FIELD OF THE INVENTION

This invention relates to methods of and/or apparatus for supplying power to loads and has been devised particularly, though not solely, for use with electric motors, electrically operated valves and associated electronic circuitry and devices used in a laundry machine.

DESCRIPTION OF THE PRIOR ART

Many appliance motor control systems utilise direct, off line, rectified mains voltage for energising the motor. Thus, by using high voltage switching transistors, the cost of transforming the power supply to a different voltage for the motor is avoided. This does not eliminate the need for a lower voltage power supply however, as one is required to supply in particular any associated control logic.

Typically most low voltage supplies are derived via a step down transformer or, as is becoming more prevalent, a switched mode power supply.

The typical components of a motor control system include in part a large motor winding inductance and expensive high voltage power transistors. When one considers the low voltage power supply, particularly a switched mode power supply, it can be seen that in addition to the motor inductance and motor control high voltage transistors we add further power supply inductors and/or transformers in conjunction with power supply high voltage transistors, A system is disclosed herein which generates a low voltage power supply using a low voltage transistor in conjunction with the existing motor inductance and motor control high voltage transistors. The benefits include cost reduction of the low voltage power supply and/or the ability to generate low voltage currents useful to supply auxiliaries, for example the motor control circuits, a draining pump, and water supply control valves.

BRIEF SUMMARY OF THE INVENTION

It is an object of the present invention to provide methods of and/or apparatus for supplying power to loads which will overcome the above disadvantages or which will at least provide the public with a useful choice.

According to one aspect the invention consists in a method of supplying direct current electric power at a low voltage level to a load from a higher voltage direct current supply. The higher voltage supply supplying power to at least one energisable winding of an electric motor. The motor having commutation means for energising the at least one winding and the method comprising using activating means to activate or deactivate a current diversion means to allow some of the commutation current which flows in the at least one winding to flow to the load to thereby supply power to the load.

In a further aspect the invention consists in a method of supplying direct current electric power at a low voltage level to a load from a higher voltage level supply. The load comprising part of a laundry machine having a washing container, an agitator and a spin tub within the washing container. The agitator being connected so as to be rotated back and forth by an electric motor and to be rotated with the spin tub when driven continuously in one direction. The higher voltage supply supplying power to at least one energisable winding of the electric motor. The motor having commutation means for energising the at least one winding. The method comprising using activating means to activate or deactivate a current diversion means to allow some of the commutation current which flows in the at least one winding to flow to the load to thereby supply power to the load.

In a still further aspect the invention consists in a switched mode power supply for supplying direct current electric power at a low voltage level to a load. The power supply comprising an electric motor being supplied with direct current electric power at a higher voltage level and having at least one energisable winding. Commutation means for energising the at least one winding are provided and current diversion means in parallel with said load, activated or deactivated by activating means, cause some of the commutation current which flows in the at least one winding to flow to the load to thereby supply power to the load.

In a still further aspect the invention consists in a laundry machine having a washing container, an agitator and a spin tub within the washing container. The agitator being connected so as to be rotated back and forth by an electric motor and to be rotated with the spin tub when driven continuously in one direction. The laundry machine including a switched mode power supply for supplying direct current electric power at a low voltage level to a load. The power supply comprising the motor being supplied with direct current electric power at a higher voltage level and having at least one energisable winding Commutation means for energising the at least one winding are provided and current diversion means in parallel with said load, activated or deactivated by activation means cause some of the commutation current which flows in the at least one winding to flow to the load to thereby supply power to the load.

To those skilled in the art to which the invention relaxes, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention consists in the foregoing and also envisages constructions which the following gives examples only.

DETAILED DESCRIPTION OF THE INVENTION

Figure 1:
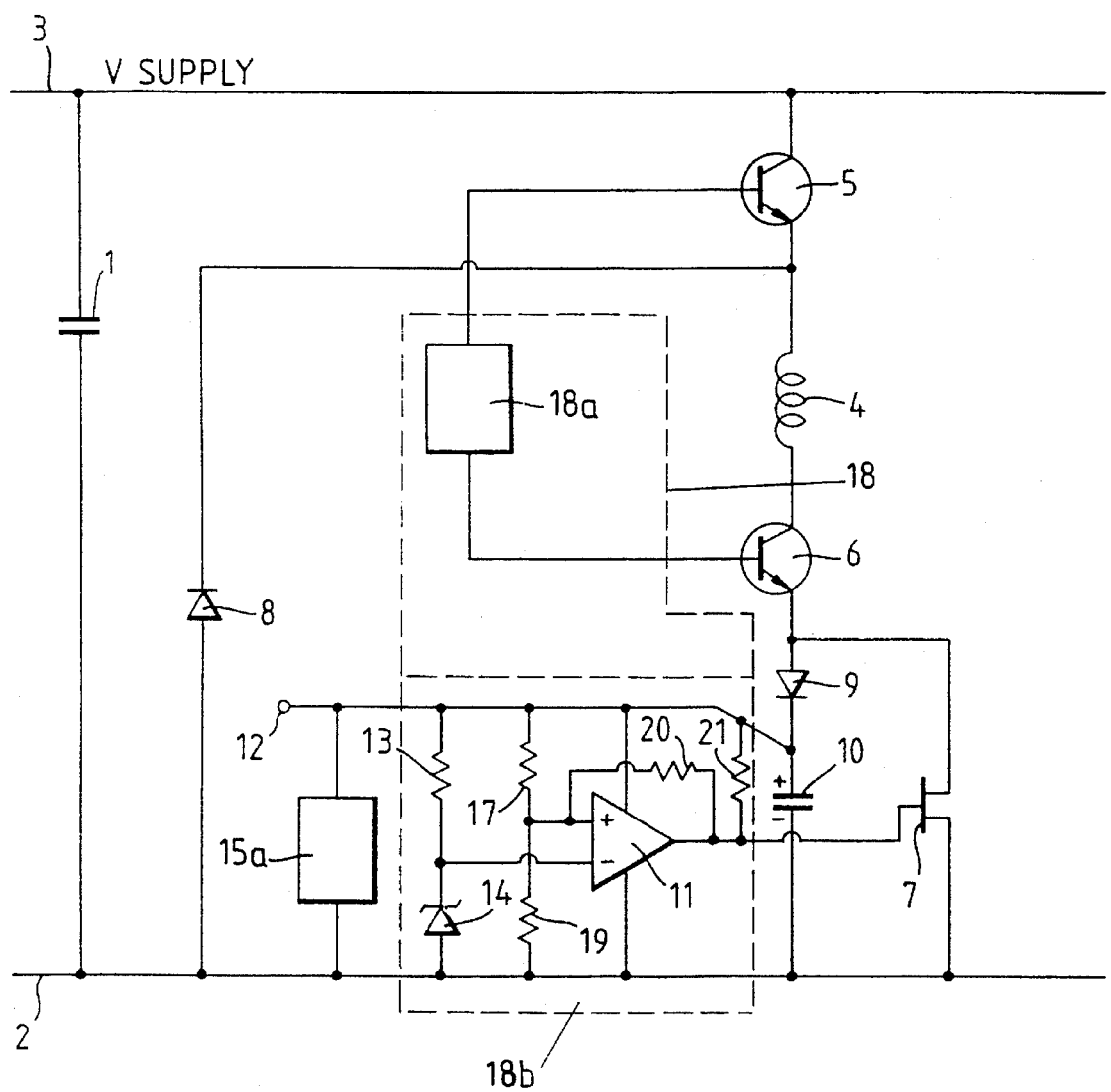
FIG. 1 is a simplified circuit diagram of an electronically commutated motor including power supply means according to the present invention connected to said motor.

Referring to the drawings, FIG. 1 shows a capacitor 1 which is connected across the output of an A.C. driven full wave rectified unfiltered power supply (not shown), the power supply being connected between rail 2 being a reference or zero potential and rail 3 being the rail labelled "V supply". An inductor in the form of a winding 4 of an electronically commutated motor (ECM) is shown connected to rails 2 and 3 by means of electronic switching devices comprising transistor switches 5 and 6 and a field effect transistor (FET) 7 comprising current diversion means. It will be seen that if transistors 5 and 6 and the field effect transistor 7 are turned on then current will flow from V supply through transistor 5, the motor winding 4, transistor 6 and field effect transistor 7 to rail 2. When transistor 5 is turned off, current will continue to flow from the inductor 4 through the circuit formed by the transistor 6, the field effect transistor 7 and a free wheel diode 8. Connected in series between the emitter of transistor 6 and rail 2 are a diode 9 and an electrolytic capacitor 10. A comparator 11 which, with associated components and circuitry, are generally referenced 18b in FIG. 1, form activating means has its supply terminals connected across capacitor 10 and the non-inverting input of comparator 11 is connected between a voltage divider comprising sensing means having two resistors 17 and 19. The inverting input to the comparator 11 is connected between a resistor 13 and a zener diode 14 and the output of the comparator is connected directly to the gate of FET 7 the source of which is connected to rail 2 and the drain of which is connected to the emitter of transistor 6. A switched load 15a is connected between rail 2 and rail 12 and PWM and commutating means 18a forming part of control means 18 control transistors 5 and 6.

The operation of the circuit is as follows. With V supply present between rails 2 and 3, transistors 5 and 6 are turned on by the PWM and commutating means 18a which, with the activating means 18b, form control means 18. Assuming that field effect transistor 7 is also turned on, current will flow from rail 3 through transistor 5, the motor winding 4, transistor 6 and the field effect transistor 7 to rail 2.

As current from winding 4 is flowing to rail 2 through FET 7, any charge present in capacitor 10 is flowing from the capacitor through rails 12 and 2 if the load 15a is switched on. As the charge in the capacitor is expended in supplying the load, the voltage across the terminals of the capacitor will decrease and thus the potential of rail 12 will decrease with respect to rail 2.

As the potential of rail 12 decreases the potential of the non-inverting input of the comparator 11 will also fall. The potential of the inverting input of the comparator will remain constant at some voltage below that of rail 12 depending on the selection of the zener diode 14. Resistor 13 is selected to limit the flow of current through zener diode 14. The desired potential of rail 12 with respect to rail 2 may be 15 volts for example so the zener diode 14 may well be selected to have a reverse breakdown voltage of 5 volts and the non-inverting input may be at a voltage of 5 volts when the potential of rail 12 is at 15 volts, dependent in the selection of resistors 17 and 19. A hysteresis resistor 20 is provided to enable stable operation of the circuit and a pull up resistor 21 is present between the rail 12 and the output of comparator 11. Thus, following this example the inverting input of the comparator will remain at a constant 5 volts with respect to rail 2, while the potential of the non-inverting input will vary depending on the charge present in capacitor 10, which in turn is dependent on whether the load 15 is switched on or off. If the load is switched on the capacitor 10 will be discharged, the rate of discharge being dependent on the impedance of load 15a.

As the capacitor discharges through the load 15a and the potential of rail 12 decreases the output voltage of the comparator will also drop since the potential of the non-inverting input approaches that of the inverting input. FET 7 is selected to operate so that a potential of zero volts between the gate and the source turns the FET off and a higher potential between the gate and source turns the FET on. Thus an appropriate drop in output voltage of the comparator will turn FET 7 off and the current flowing in winding 4 will flow through load 15a and also through diode 9 and into capacitor 10 and the potential of rail 12 will increase with respect to rail 2.

As the potential of rail 12 increases, the potential of the non-inverting input will increase with respect to the potential of the inverting input which increases the output voltage of the comparator which in turn causes FET 7 to be turned on to divert current in winding 4 directly to rail 2, such that the capacitor 10 supplies the load until the potential of rail 12 again drops sufficiently to turn off the FET 7.

Therefore the potential of rail 12 with respect to rail 2 will ramp up and down slightly as the FET 7 is turned off and on and the extent of the change in potential of rail 12 will depend on the selection of zener diode 14 and resistors 17 and 19 and the value of the hysteresis resistor 20. It will be seen that although the potential of rail 12 varies, it will remain substantially the same as the desired potential, e.g. 15 volts as above referred to. The variation in potential of rail 12 with respect to rail 2 can be controlled depending on the selection of zener diode 14, resistors 17 and 19, FET 7 and comparator 11.

As stated, as a result of the FET being turned off the path to the zero rail 2 includes the load 15a and as a result the potential of 15 volts is applied to the load so that winding 4 and load 15a are in series causing operation of any switched-on low voltage device or device forming part of that load. The potential of rail 12 rises to cause that current to flow but some time will elapse before the potential of rail 12 increases sufficiently to cause the FET 7 to be turned on again.

Figure 2:
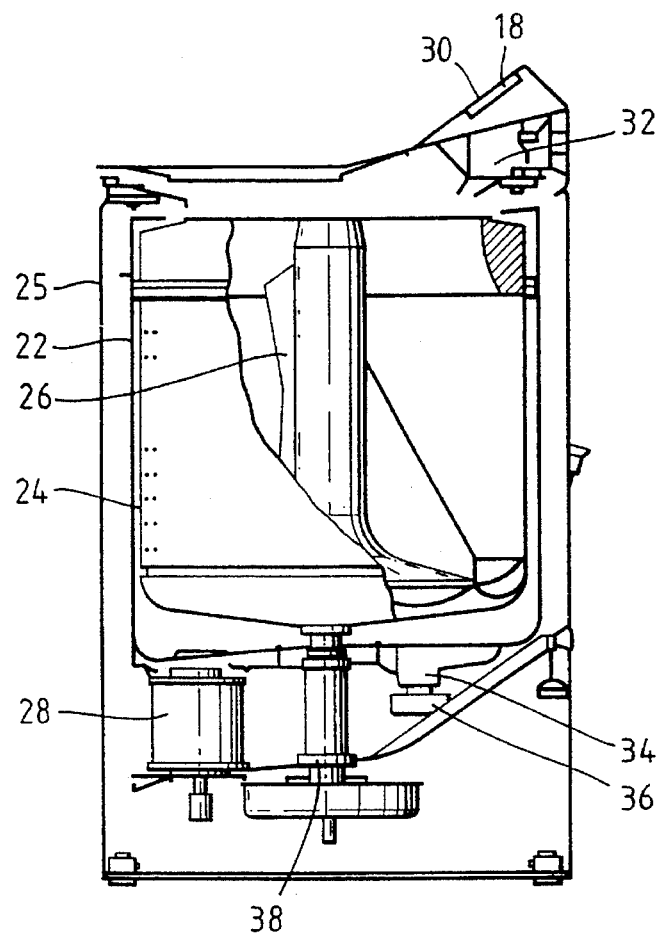
FIG. 2 is a diagrammatic cross section of a washing machine according to the present invention shown in side elevation.

Referring now to FIG. 2 a side elevation of a washing machine incorporating the present invention is shown in cross section. The washing machine 25 has a washing container 22 for holding the washing liquid and clothes and also has a spin tub 24 and an agitator 26 therein. An electric motor being an electronically commutated motor 28 is also provided and this motor drives the agitator 26 to agitate the clothes in the washing container 22 and provides a spinning action to spin the clothes in the container when the agitator 26 and spin tub 24 are interconnected. The washing machine also has a control console 30 and electronic controller 37 for controlling the operation of the washing machine. The machine also has electrically operated valves 32 for admitting water into the washing container 22 and a drain pump 34 for pumping water or washing liquid from container 22 as required. Pump 34 is driven by an electric motor 36. Electronic controller 37 comprises at least one microprocessor and electronic circuitry required for the operation of the microprocessor. The power supply referred to above with reference to FIG. 1 is preferably located adjacent motor 28 and is referenced 38 in FIG. 2.

Figure 3:
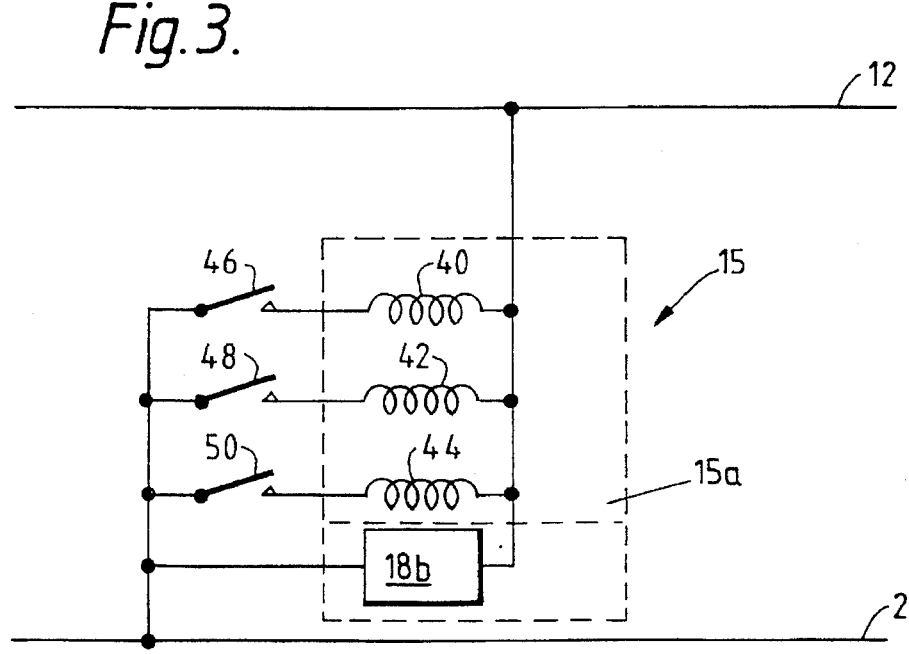
FIG. 3 is a circuit diagram representing a load or loads to which the power supply of the present invention supplies power.

The load 15a referred to in the description of FIG. 1 above is shown in more detail in FIG. 3. In FIG. 3 the load 15a is connected in series between power supply rails 2 and 12 and together with actuating means 18*b* comprise the total load 15 supplied from rail 12. It will be seen that the load 15*a* has three primarily inductive loads 40, 42 and 44 and these loads may be actuated at any time e.g. by the closure of switches 46, 48 and 50 respectively. Loads 40 and 42 represent the two valves 32 in FIG. 2 which comprise solenoids having valve members in magnetic relation therewith, the valve members being actuated upon actuation of the solenoids allowing proportional control of the valves. Such proportionally controlled valves are disclosed in our New Zealand patent no. 223460.

The proportionally controlled valves described in the above patent operate from a 12 to 15 volt direct current supply and draw a relatively high current and in the present invention at least two valves 32 are provided, one for supplying hot water and one for supplying cold water to the container 22. The switches 46 and 48 will switch the valve solenoids comprising loads 40 and 42 on or off as required by the electronic controller 37 in order to fill container 22 to a desired level with water at a desired temperature. Also, load 44 comprises pump motor 36 and this motor will be turned on by electronic controller 37 when switch 50 is closed by the electronic controller in order to empty the container of water or washing liquid. All the loads 40 to 44 comprise devices which operate from a low voltage but which draw a high current to give the required voltage. The manner in which the power supply according to the present invention supplies these relatively high power loads with the currents they require is described further below.

The electronic controller 37 operates from a D.C. power supply of e.g. 15 volts and draws very little current e.g. less than 1 amp so it does not draw excessive current from the motor windings.

The electronic controller 37 is also supplied with power from the motor windings via a connection to rail 12. Therefore electronic controller 37 also forms part of the total load 15 and a start up power supply is required to supply an initial quantity of energy to the electronic controller 37 so that the electronic controller can energise the motor windings to supply load 15 and thus continue the supply of power to the electronic controller. A number of start-up techniques and circuits are known. Two such start-up circuits are shown in FIGS. 4 and 5.

Figure 4:
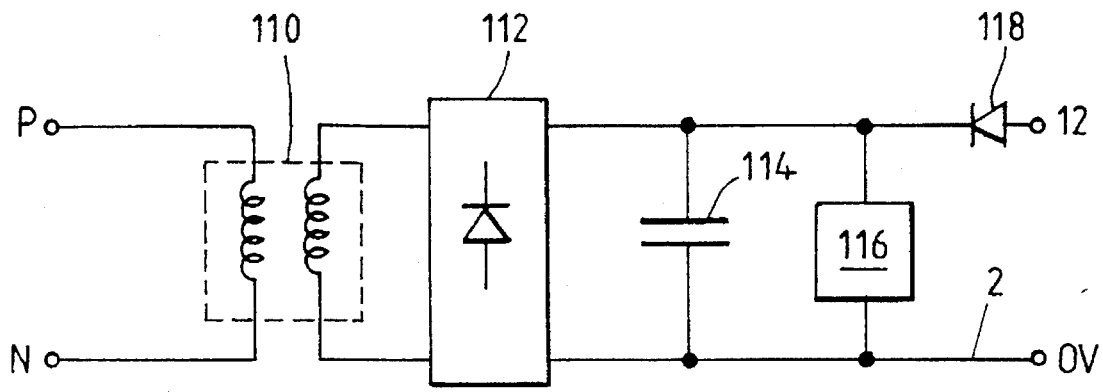
FIGS. 4 and 5 are circuit diagrams of alternative start up power supply means according to the present invention.

Referring to FIG. 4, a starting means is shown comprising a small e.g. 1 to 2 VA transformer 110, one winding of which is connected to the mains supply of e.g. 230 or 120 volts at P and N. The secondary winding of the transformer is connected to a diode bridge 112 which supplies full wave rectified current to a filter capacitor 114. The resulting D.C. voltage across capacitor 114 is sufficient e.g. 15 volts to supply the essential standby load 116 of the electronic controller load which must be supplied to initiate those parts of the electronic controller necessary to begin energisation of the motor windings to actuate the power supply. Diode 118 prevents the start up supply from supplying any load between rail 12 and the 0 volt rail to which the start-up supply is connected.

Figure 5:
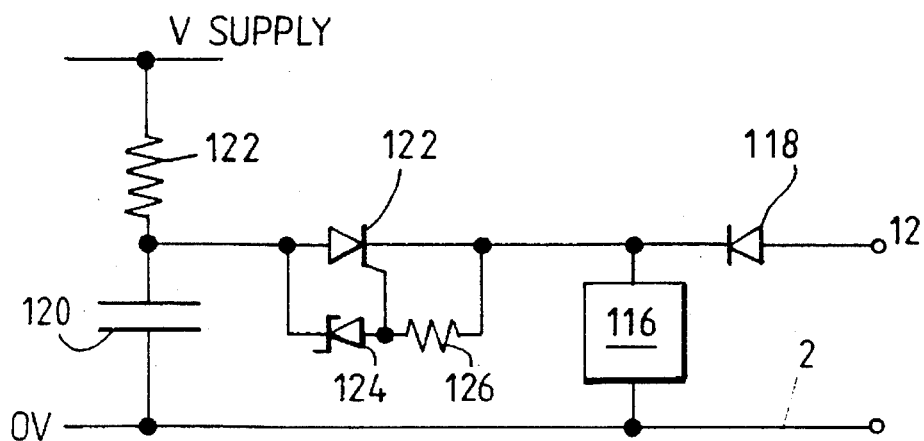

Referring to FIG. 5 another start-up supply is shown in which a capacitor 120 and a resistor 122 are connected between the V supply and 0V rails. The charge present in capacitor 120 is discharged to the essential standby load 116 through SCR 122 the gate of which is connected between zener diode 124 and resistor 126. The zener diode 124 is rated at e.g. 15 volts, being the desired potential of the electronic controller power supply relative to the 0 V rail.

The charge supplied by capacitor 120 is sufficient to supply the essential standby load 116 for sufficient time to enable at least one motor winding to be energised and so actuate the power supply.

Figure 6:
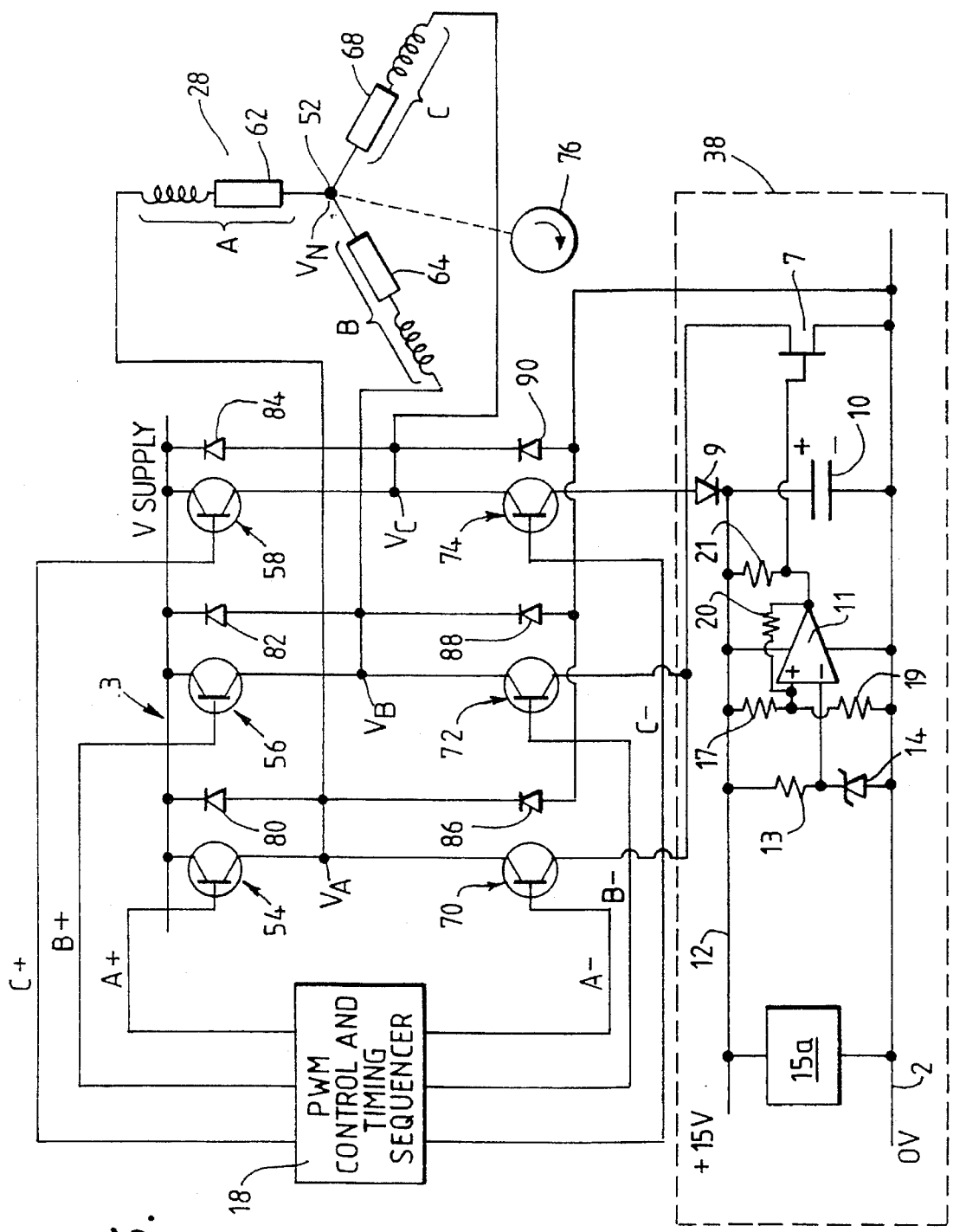
FIG. 6 is a simplified circuit diagram of an electronically commutated motor having three windings when connected to the power supply means FIG. 1.

We refer now to FIG. 6 which is a circuit diagram of the power supply to and electronic control of the motor 28 of the laundry machine of FIG. 2 and incorporating the present invention. Thus motor 28 has three energisable windings with a common point 52 and a switching bridge in which three switching devices 54, 56 and 58 connect the supply positive rail 3 to the ends of the windings 62, 64 and 68 and three further switches 70, 72 and 74 connect the ends of the windings to the further supply rail 18. The upper switches 54, 56 and 58 may be referred to as the A+, B+ and C+ switches and the lower switches 70, 72 and 74 may be referred to as the A−, B− and C− switches. Control means 18 control the operation of the transistors and the points $V_A$, $V_B$ and $V_C$ represent the connections between the switching devices and the windings. The motor 28 includes a rotor 76 and diodes 80 to 90 are free wheel diodes which allow dissipation of the current in the motor windings after the switches have been turned off. The operation of the power regulating section of the circuit shown in FIG. 1 is the same as the operation of the power regulating circuit 38 described above. However it will be noted that in the circuit of FIG. 1 the winding represented by inductor 4 in FIG. 1 will now become combinations of windings A, B and C. Thus, if for example the A+ switch and the C− switch are turned on then current will flow from the V supply rail 3 through switch A+, through winding A then winding C and then through switch C− then FET 7 if this is turned on, to rail 2. Thus during normal operation of the motor 28 with the rotor 76 rotating current will be supplied to FET 7 or the capacitor 10 as the windings of the motor are energised. It will also be seen that the motor may be held stationary while current is intermittently supplied to some of the windings of the motor thus supplying current to the power supply section of the circuit if required. Thus for example switch A+ may be turned on and switch B− may also be switched on such that current is flowing through these windings, then the rotor will align itself in a set position with respect to these windings. To prevent excess current in these windings the upper switches e.g. A+ can be pulsed on intermittently so that current is always flowing through these windings through the flywheel diodes 80, 82 and 84 of the upper switching devices. The rotor can be made to maintain substantially the same position while the windings are effectively supplying current to capacitor 10 in the power supply circuitry.

Thus a 15 volt supply is available to that part of the total load 15 comprising the logic circuitry required for operation of the motor. As described above the total load 15 comprises loads which although operating from a 15 volt supply will draw relatively high currents eg. 5 amps. Most known low voltage power supplies are designed to supply low currents since supplies become very expensive as higher current ratings are required and it is therefore not economical to provide appliances such as washing machines with known low voltage supplies which have the ability to supply high loads.

It is advantageous to have other devices in washing machines or other appliances which operate from low voltages, since low voltage operation reduces the need for complying with safety standards for mains voltage operation which may make the production of such appliances prohibitively expensive. Switch costs and insulation costs are also reduced if low voltage operation is possible. The motor load 44 (FIG. 3) may for example comprise e.g. a 50 Watt motor and if operating at 15 volts such a motor may well draw 3 to 4 amps. Thus the additional power supply circuitry described above is required to operate such a motor.

From the foregoing it will be seen that a power supply is provided which requires a minimum number of components which may be supplied at low cost, since the expensive inductor and switches are already present in the form of an electronically commutated motor. It will also be seen that such a power supply is advantageous in respect of many appliances since it allows high loads to be operated at a safe low voltage.

I claim:

1. A method of producing a low voltage direct current for supplying a low voltage load from an electronically commutated motor system, which system comprises a high voltage direct current supply, a plurality of motor windings each having an inductance, and commutation switches which periodically connect said windings to said high voltage direct current supply to produce a current therein, said method comprising the steps of:

connecting at least one motor winding to said high voltage direct current supply;

diverting the current flowing through said at least one winding through said low voltage load using current diversion means;

controlling the current diversion means in accordance with the requirements of said low voltage load; and providing a return path through said low voltage load so that current due to the winding inductance in said at least one winding will flow in said low voltage load whenever said high voltage direct current supply is disconnected from said at least one winding by one of said commutation switches.

2. A method as claimed in claim 1, which further includes the step of supplying some of said current flowing through said at least one winding to an energy storage means in electrical connection with said low voltage load so that power is substantially continuously supplied to said low voltage load.

3. A method as claimed in claim 1 or claim 2, which further includes the steps of:

sensing that power is required to be supplied to said low voltage load with sensing means; and using activating means to activate said current diversion means if said sensing means indicate that power is not required to be supplied to said low voltage load and to deactivate said current diversion means if said sensing means indicate that power is required to be supplied to said low voltage load.

4. A method as claimed in claim 1 or claim 2, which includes the steps of controlling said commutation switches to energize and deenergize said at least one winding intermittently to commutate power to said electronically commutated motor system.

5. A method as claimed in claim 1 or claim 2, further including the step of using activating means to activate or deactivate said current diversion means to cause current flowing through said at least one winding to be diverted into said low voltage load on demand.

6. A method as claimed in claim 5, which further includes the step of supplying power to a control means, which controls said commutation switches and said activating means, such that said control means comprises part of said low voltage load.

7. A method as claimed in claim 5, which further includes the step of initially supplying power to a control means, which controls said commutation switches and said activating means, using a starting power supply means to start operation of said control means.

8. A method of producing a low voltage direct current for supplying a low voltage load in a laundry machine having a washing container, an agitator and a spin tub within said washing container, said agitator being connected so as to be rotated back and forth by an electronically commutated motor system and to be rotated with said spin tub when driven continuously in one direction, said electronically commutated motor system comprising a high voltage direct current supply, a plurality of motor windings each having an inductance, and commutation switches which periodically connect said windings to said high voltage direct current supply to produce a current therein, and said method comprising the steps of:

connecting at least one motor winding to said high voltage direct current supply;

diverting the current flowing through said at least one winding through said low voltage load using current diversion means;

controlling the current diversion means in accordance with the requirements of said low voltage load; and providing a return path through said low voltage load so that current due to the winding inductance in said at least one winding will flow in said low voltage load whenever said high voltage direct current supply is disconnected from said at least one winding by one of said commutation switches.

9. An electronically commutated motor system which produces a low voltage direct current for supplying a low voltage load comprising:

a high voltage direct current supply;

a plurality of motor windings each having an inductance;

commutation switches which periodically connect said windings to said high voltage direct current supply to produce a current therein;

a series circuit in series with at least one of said windings which includes current diversion means and means in parallel with said current diversion means to supply said low voltage load;

activating means for activating and deactivating said current diversion means to cause current flowing through said at least one motor winding to be diverted into said low voltage load on demand; and unidirectional current means connected across said at least one winding and said series circuit which allow current due to the winding inductance in said at least one winding to flow from said at least one winding through said series circuit when one of said commutation switches disconnects said at least one motor winding from said high voltage direct current supply.

10. A switched mode power supply as claimed in claim 9, wherein said means in parallel with said current diversion means includes a reservoir capacitor in parallel with said low voltage load so that power is substantially continuously supplied to said low voltage load.

11. A switched mode power supply as claimed in claim 9 or claim 10, including sensing means for sensing the power demanded by said low voltage load and supplying signals to said activating means to activate said current diversion means if said sensing means indicate that power is not required by said low voltage load and to deactivate said current diversion means if said sensing means indicate that power is required by said low voltage load.

12. A switched mode power supply as claimed in claim 9 or claim 10, further including control means to control said commutation switches to energize and de-energize said at least one winding intermittently to commutate power to said at least one winding.

13. A switched mode power supply as claimed in claim 12, wherein said control means, which include said commutation switches and said activating means, comprise part of said low voltage load.

14. A switched mode power supply as claimed in claim 9 or claim 10, including control means to control said power supply and starting means for providing an initial supply of power to said control means sufficient to allow said control means to cause said commutation switches to energize said at least one winding to supply power to said low voltage load.

15. A laundry machine having a washing container, an agitator and a spin tub within said washing container, said agitator being connected so as to be rotated back and forth by an electronically commutated motor system and to be rotated with said spin tub when driven continuously in one direction, wherein said electronically commutated motor system comprises:

a high voltage direct current supply;

a plurality of motor windings each having an inductance;

commutation switches which periodically connect said windings to said high voltage direct current supply to produce a current therein;

a series circuit in series with at least one of said windings which includes current diversion means and means in parallel with said current diversion means to supply said low voltage load;

activating means for activating and deactivating said current diversion means to cause current flowing through said at least one motor winding to be diverted into said low voltage load on demand; and unidirectional current means connected across said at least one winding and said series circuit which allow current due to the winding inductance in said at least one winding to flow from said at least one winding through said series circuit when one of said commutation switches disconnects said at least one motor winding from said high voltage direct current supply.

* * * * *